United States Patent
Lee et al.

(10) Patent No.: US 9,798,491 B2
(45) Date of Patent: Oct. 24, 2017

(54) SEMICONDUCTOR SYSTEM AND OPERATING METHOD THEREOF

(71) Applicant: SK hynix Inc., Gyeonggi-do (KR)

(72) Inventors: Kyung-Min Lee, Gyeonggi-do (KR); Young-Suk Moon, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 8 days.

(21) Appl. No.: 14/982,512

(22) Filed: Dec. 29, 2015

(65) Prior Publication Data
US 2017/0060475 A1     Mar. 2, 2017

(30) Foreign Application Priority Data
Aug. 26, 2015 (KR) .................. 10-2015-0120067

(51) Int. Cl.
G06F 9/26 (2006.01)
G06F 3/06 (2006.01)
G06F 9/345 (2006.01)

(52) U.S. Cl.
CPC .......... *G06F 3/0653* (2013.01); *G06F 3/0604* (2013.01); *G06F 3/0638* (2013.01); *G06F 3/0679* (2013.01); *G06F 9/345* (2013.01)

(58) Field of Classification Search
None
See application file for complete search history.

(56) References Cited

U.S. PATENT DOCUMENTS

| 5,388,237 A | 2/1995 | Sodos |
| 8,775,762 B2 | 7/2014 | Loh et al. |
| 2015/0301749 A1* | 10/2015 | Seo .................. G06F 3/0611 714/6.24 |

\* cited by examiner

*Primary Examiner* — Brian Peugh
(74) *Attorney, Agent, or Firm* — IP & T Group LLP

(57) ABSTRACT

A semiconductor system may include a plurality of memory devices corresponding to a plurality of channels, an address mapping unit suitable for converting addresses corresponding to provided external requests according to a selected address map among a plurality of address maps; a monitoring unit suitable for monitoring the external requests provided to each of the plurality of channels, and a control unit suitable for providing a control signal for controlling the address mapping unit to select an address map according to a result of the monitoring.

16 Claims, 3 Drawing Sheets

| Channel | Round 1 | Round 2 | Round 3 |
|---|---|---|---|
| CH0 | 10 | 18 | 6 |
| CH1 | 8 | 12 | 4 |
| Average MPKC | 9 | 15 | 5 |
| MPKC Difference | 1 | 3 | 1 |
| Avg. MPKC Difference | | 2 | 1.6 |
| Avg. MPKC | | 12 | 9.6 |

Avg. MPCK Difference / Avg. MPKC = 0.167

FIG. 3

| Channel | Round 1 | Round 2 | Round 3 |
|---|---|---|---|
| CH0 | 10 | 18 | 6 |
| CH1 | 8 | 12 | 4 |
| Average MPKC | 9 | 15 | 5 |
| MPKC Difference | 1 | 3 | 1 |
| Avg. MPKC Difference | | 2 | 1.6 |
| Avg. MPKC | | 12 | 9.6 |
| Avg. MPCK Difference / Avg. MPKC = 0.167 | | | |

FIG. 4

| Channel | Round 1 | Round 2 | Round 3 |
|---|---|---|---|
| CH0 | 2 | 10 | 7 |
| CH1 | 16 | 20 | 3 |
| Average MPKC | 9 | 15 | 5 |
| MPKC Difference | 7 | 5 | 2 |
| Avg. MPKC Difference | | 6 | 4.6 |
| Avg. MPKC | | 12 | 8.6 |
| Avg. MPCK Difference / Avg. MPKC = 0.534 | | | |

# SEMICONDUCTOR SYSTEM AND OPERATING METHOD THEREOF

CROSS-REFERENCE TO RELATED APPLICATIONS

The present application claims priority of Korean Patent Application No. 10-2015-0120067, filed on Aug. 26, 2015, which is incorporated herein by reference in its entirety.

BACKGROUND

1. Field

Exemplary embodiments of the present invention relate generally to semiconductor design technology, and more particularly, to a semiconductor system having an improved address mapping scheme and an operating method thereof.

2. Description of the Related Art

In a memory controller, the address mapping scheme employed is an important characteristic of the overall performance of the controller. Generally, a memory controller may process requests provided from one or more hosts, and may convert address bits included in the requests into actual memory locations of a memory device according to an address mapping scheme. For improving the operational speed of a memory controller, a technique known as channel interleaving is often used.

Also, oftentimes, in designing a memory controller, a plurality of address maps are provided in advance and a test signal are directly inputted to all of the address maps, so that use of any one of the address maps may be determined according to the degree of utilization of a data pad, channel interleaving, and latency results. However, existing devices are generally limited in their ability to obtain accurate channel interleaving. Also, existing techniques place a large burden on the user which may compromise the accuracy of channel interleaving results due to human error. For example, generally, existing schemes may require a user to directly input a test signal while changing the address maps one by one.

SUMMARY

Various embodiments are directed to a semiconductor system capable of selecting an address map by monitoring channel interleaving and an operating method thereof.

In an embodiment, a semiconductor system may include: a plurality of memory devices corresponding to a plurality of channels; an address mapping unit suitable for converting addresses corresponding to provided external requests according to a selected address map among a plurality of address maps; a monitoring unit suitable for monitoring the external requests provided to each of the plurality of channels; and a control unit suitable for providing a control signal for controlling the address mapping unit to select an address map according to a result of the monitoring.

The semiconductor system may further include a host suitable for providing the requests and receiving the control signal from the control unit.

The address mapping unit may convert logical addresses provided along with the external requests to physical addresses for the plurality of memory devices according to the selected address map.

The monitoring unit may be a Misses per kilo cycles (MPKC) monitor suitable for monitoring a number of the external requests inputted to each of the plurality of channels for 1000 cycles according to the selected address map.

The control unit may control the address mapping unit to select an address map having an optimal channel interleaving value according to a result of the monitoring.

In another embodiment, a semiconductor system may include: a host; a plurality of memory devices; and a memory controller that controls the plurality of memory devices, wherein the memory controller may include: an address mapping unit suitable for converting addresses corresponding to provided external requests according to a selected address map among a plurality of address maps; and a monitoring unit suitable for monitoring the external requests provided to each of the plurality of channels, wherein the host controls the address mapping unit to select one among the plurality of address maps according to a result of the monitoring.

The address mapping unit may convert logical addresses provided along with the external requests to physical addresses for the plurality of memory devices according to the selected address map.

The monitoring unit may be a Misses per kilo cycles (MPKC) monitor suitable for monitoring a number of the external requests inputted to each of the plurality of channels for 1000 cycles according to the selected address map.

The host may include a control unit suitable for controlling the address mapping unit to select an address map having an optimal channel interleaving value according to a result of the monitoring.

The memory controller may further include an input control unit suitable for controlling transfer of a request for a next address map from the host to the address mapping unit whenever the monitoring to each of the plurality of address maps is completed.

The memory controller may further include: a mediation unit suitable for performing a scheduling operation to the provided external requests according to a high priority; and a command generation unit suitable for sequentially generating commands for controlling the plurality of memory devices in response to the external requests scheduled by the mediation unit.

In another embodiment, an operating method of a semiconductor system may include: monitoring external requests provided to each of a plurality of channels according to a first address map; monitoring external requests provided to each of a plurality of channels according to a second address map; and comparing results of the monitoring of external requests according to the first and second address maps, and selecting one of the first and second address maps having an optimal channel interleaving value.

Each of the monitoring of the external requests according to the first and second address maps may be performed for a plurality of rounds each having 1000 cycles.

Each of the monitoring of the external requests according to the first and second address maps may include: detecting a number of the external requests provided to each of the plurality of channels during each of the plurality of rounds; detecting a request average value between channels of each of the plurality of rounds; detecting a request difference value between the channels of each of the plurality of rounds; detecting a request difference average value between the plurality of rounds through the request difference value between the channels detecting a request average value between the plurality of rounds through the request average value between the channels; and obtaining the channel interleaving value for the corresponding address map through a request difference average value between the rounds and the request average value between the rounds.

The selecting of one of the first and second address maps may be performed by selecting one of the first and second address maps having a minimum value between the channel interleaving values of the first and second address maps.

According to the semiconductor system according to embodiments of the present invention, it is possible to effectively verify and use an address map by monitoring channel interleaving for a plurality of channels.

BRIEF DESCRIPTION OF THE DRAWINGS

FIG. 3 is a diagram illustrating a result obtained by monitoring channel interleaving for a first address map of a plurality of address maps, according to an embodiment of the present invention.

FIG. 4 is a diagram illustrating a result obtained by monitoring channel interleaving for a second address map of a plurality of address maps according to an embodiment of the present invention.

DETAILED DESCRIPTION

Figure 1:
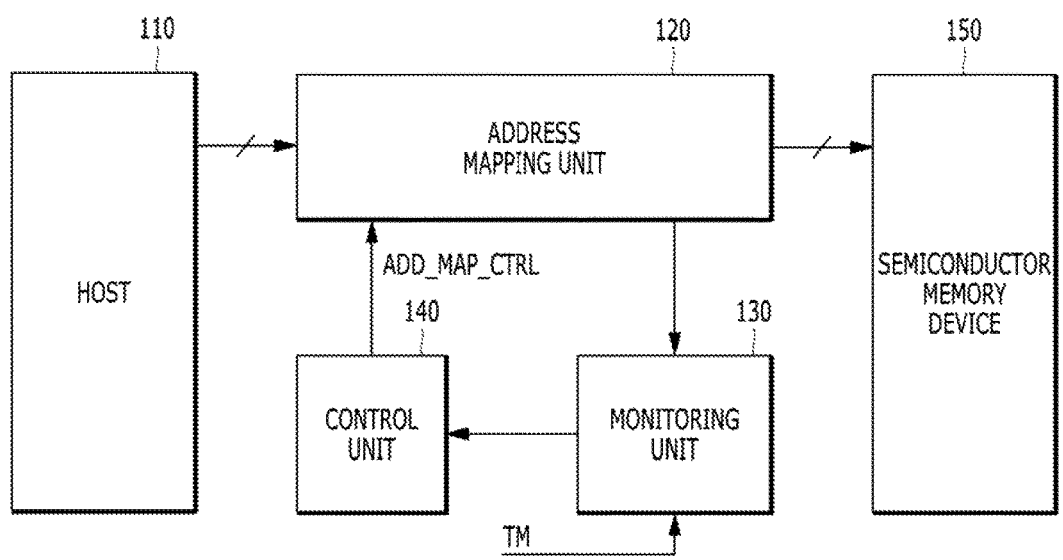
FIG. 1 is a configuration diagram of a semiconductor system, according to an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete. Throughout the disclosure, like reference numerals refer to like parts throughout the various figures and embodiments of the present invention.

Referring to FIG. 1, the semiconductor system may include an address mapping unit 120, a monitoring unit 130, a control unit 140, and a semiconductor memory device 150. The semiconductor system may be operatively linked to a host 110. The host 110 may be an integral part of the semiconductor system. The host 110 may be a separate part of the semiconductor system.

The semiconductor memory device 150 may include a plurality of memory devices corresponding to a plurality of channels.

The host 110 may provide the address mapping unit 120 with a request corresponding to an operation for at least one of the plurality of channels. The request may be, for example, a read and/or a write operation to at least one of the plurality of the semiconductor memory devices 150. In an embodiment, the host 110 may provide the address mapping unit 120 with a plurality of requests corresponding to a plurality of operations for a plurality of the channels. The requests may be read and/or a write operation requests for a plurality of the semiconductor memory devices 150.

The address mapping unit 120 may receive a request provided from the host 110 and convert a logical address corresponding to the request into a physical address. For example, the address mapping unit 120 may perform an XOR operation to the logical address and key data. The address mapping unit 120 may include a plurality of address maps.

In response to a test mode signal TM, the monitoring unit 130 may detect one or more requests provided from the host 110 to the address mapping unit 120 through one or more channels, and monitor channel interleaving of the address mapping unit 120. The monitoring unit 130 may be or comprise a monitor, referred to herein after as a Misses per kilo cycles (MPKC) monitor which is capable of monitoring a number of requests per channel per 1000 cycles. For example, the monitoring unit 130 may detect the number of requests per channel during each of a plurality of rounds, each round comprising 1000 cycles, and derive a channel interleaving result value according to the calculation described in detail with reference to FIGS. 3 and 4.

A test mode signal TM may be enabled during a boot-up operation. The test mode signal TM may activate the monitoring unit 130 to monitor the channel interleaving operation of the address mapping unit 120 for at least one of the plurality of address maps. For example a test operation for at least one of the plurality of address maps may be performed according to a test mode signal TM enabled during a boot-up operation. Hence, an additional test operation time for the plurality of address maps is not required.

The control unit 140 may control the plurality of address maps included in the address mapping unit 120 according to the channel interleaving values derived by the monitoring unit 130 for the plurality of address maps. For example, the control unit 140 may select an address map having an optimal channel interleaving value.

In an embodiment of the present invention, the control unit 140 may directly control the address mapping unit 120, thereby selecting an address map having an optimal channel interleaving value from the plurality of address maps. However, according to another embodiments, the channel interleaving values for the plurality of address maps may be outputted to the host 110, so that the host 110 may control the address mapping unit 120 based on the channel interleaving values.

Hereinafter, an operation of the semiconductor system will be described.

During a test mode for the address maps during the boot-up operation, the address mapping unit 120 may perform a channel interleaving operation by selecting an address map, converting a logical address corresponding to the external request from the host 110 into a physical address according to the selected address map, and outputting the physical address.

The monitoring unit 130 may monitor the channel interleaving for a plurality of address maps, detect the number of external requests provided from the host 110 through the plurality of channels, and derive the channel interleaving value. As described above, when the monitoring unit 130 outputs a channel interleaving value for each of the plurality of address maps the control unit 140 may control the address mapping unit 120 to select an address map having an optimal channel interleaving value.

According to an embodiment of the invention, a semiconductor system is provided which during a boot-up operation, may select an address map from a plurality of address maps of an address mapping unit, based on an optimal channel interleaving. For example the semiconductor system may be monitoring channel interleaving for each of a plurality of address maps comprised in an address mapping unit 120. The monitoring may be performed in a real-time manner. Hence, the semiconductor system may require less test time for checking which address map out of a plurality of address maps may have optimal performance.

Figure 2:
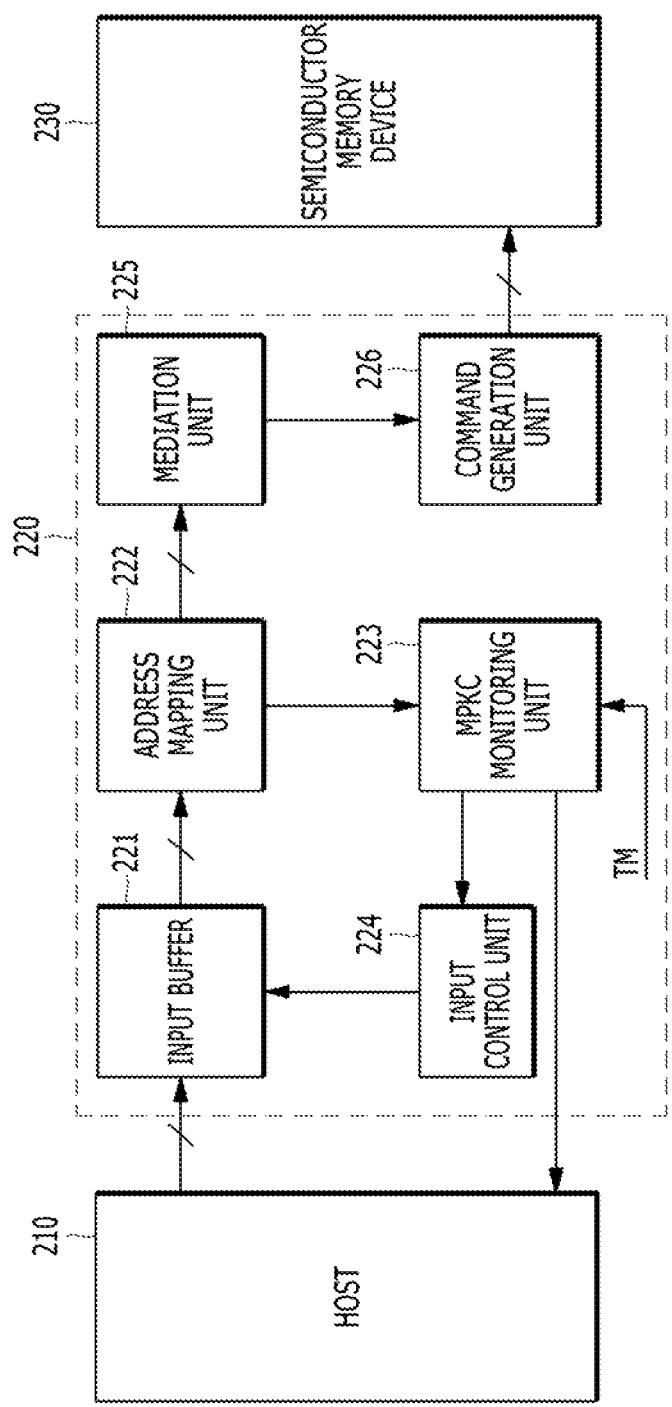
FIG. 2 is a configuration diagram of a semiconductor system, according to another embodiment of the present invention.

Referring to FIG. 2, a semiconductor system, according to another embodiment of the invention may include a host 210, a memory controller 220, and a semiconductor memory device 230. The semiconductor memory device 230 may include a plurality of memory device (not illustrated) respectively corresponding to a plurality of channels.

The host 210 may provide the memory controller 220 with requests corresponding to a plurality of operations for the plurality of channels. The requests may be requests for operations such as a read operation and a write operation for the semiconductor memory device 230.

The memory controller 220 may include an input buffer 221, an address mapping unit 222, a Misses per kilo cycles (MPKC) monitoring unit 223, an input control unit 224, a mediation unit 225, and a command generation unit 226.

The input buffer 221 may buffer a logical address provided along with the request from the host 210.

The address mapping unit 222 may receive the logical address from the input buffer 221 and perform a channel interleaving operation by selecting one among the plurality of address maps and converting the logical address into a physical address. For example, the address mapping unit 222 may perform the XOR operation on the logical address and key data. Furthermore, the address mapping unit 222 may include a plurality of address maps.

In response to the test mode signal TM, the MPKC monitoring unit 223 may detect the requests, which are provided from the host 110 to the address mapping unit 222 through the plurality of channels, and monitor channel interleaving of the address mapping unit 222. The MPKC monitoring unit 223 may monitor the number of requests to each channel per 1000 cycles. Furthermore, the MPKC monitoring unit 223 may detect the number of provided requests to respective channels during each of a plurality of rounds, each round comprising 1000 cycles, and derive the channel interleaving value. The calculation of the channel interleaving value will be described in detail with reference to FIG. 3 and FIG. 4.

When the channel interleaving operation for one address map is ended, the MPKC monitoring unit 223 may output an end signal indicating the end of the monitoring to the corresponding address map to the input control unit 224, and when the channel interleaving operation for all of the plurality of address maps is completed, the MPKC monitoring unit 223 may output the channel interleaving value of all of the plurality of address maps to the host 210.

The test mode signal TM may be enabled during a boot-up operation and activate the MPKC monitoring unit 223 to monitor the channel interleaving operation of the address mapping unit 222 for the plurality of address maps.

Then, the host 210 may control the address mapping unit 222 according to the channel interleaving values for the plurality of address maps provided from the MPKC monitoring unit 223. For example, the host 210 may select an address map having an optimal channel interleaving value, and use the address map in an actual operation.

The host 210 may perform the functions of the control unit 140 and the host 110 described with reference to FIG. 1.

The input control unit 224 may control the input buffer 221 to transfer a request for a next address map from the host 210 to the address mapping unit 222 in response to an end signal provided from the MPKC monitoring unit 223.

As described above, requests with respect to the plurality of address maps may be provided from the host 210 under the control of the MPKC monitoring unit 223 and the input control unit 224, and a channel interleaving value for the respective address maps may be obtained.

The mediation unit 225 may perform a scheduling operation to the plurality of requests according to a priority order. For example, the mediation unit 225 may sequentially store the requests in order of higher priority.

The command generation unit 226 may sequentially generate commands for controlling the semiconductor memory device 230 in response to the requests scheduled by the mediation unit 225, and provide the commands to the semiconductor memory device 230.

Hereinafter, an operation of the semiconductor system according to another embodiment of the present invention will be described.

During the test mode for the address maps during the boot-up operation, the input buffer 221 may buffer and output a logical address provided along with the request from the host 210 for a corresponding address map among a plurality of address maps, and the address mapping unit 222 may perform a channel interleaving operation by selecting an address map among the plurality of address maps and converting the logical address into the physical address. At the same time, the MPKC monitoring unit 223 may detect the number of external requests provided from the host 210 through the plurality of channels and derive a channel interleaving value. At the completion of a channel interleaving operation for each of the plurality of address maps the MPKC monitoring unit 223 may output an end signal indicating the completion of the monitoring to the corresponding address map to the input control unit 224. Accordingly, the input control unit 224 may control the input buffer 221 to transfer a request for a next address map from the host 210 to the address mapping unit 222 in response to the end signal provided from the MPKC monitoring unit 223.

When channel interleaving monitoring for all of the address maps is completed, the MPKC monitoring unit 223 may output the channel interleaving values of all of the plurality of address maps, one for each channel, to the host 210.

Then, the host 210 may control the address mapping unit 222 according to the channel interleaving values of the plurality of address maps provided from the MPKC monitoring unit 223. For example the host 210 may select an address map having an optimal channel interleaving value from the plurality of address maps and use the address map in an actual operation.

In a normal operation, the input buffer 221 may buffer and output the logical address corresponding to an external request provided from the host 210. The address mapping unit 222 may perform a channel interleaving operation by selecting an address map among the plurality of address maps under the control of the host 210, convert the logical address outputted from the input buffer 221 into a physical address according to the selected address map and output the physical address.

The mediation unit 225 may perform a scheduling operation to the plurality of provided requests according to a high priority order. The mediation unit 225 may sequentially store the provided requests in order of higher priority. Then, the command generation unit 226 may sequentially generate commands for controlling the semiconductor memory device 230 in response to the requests scheduled by the mediation unit 225, and provide the commands to the semiconductor memory device 230. Accordingly, the semiconductor memory device 230 may perform an internal operation in response to the commands outputted from the command generation unit 226.

Hence, according to an embodiment of the present invention, a semiconductor system is provided, which is capable during a boot up operation, to select an address map having good or optimal performance among a plurality of address maps included in an address mapping unit, by monitoring the channel interleaving of the address mapping unit 222. Channel interleaving may be performed in real-time manner. The semiconductor system may thus reduce the test time for selecting the address map having good or optimal.

FIG. 3 is a diagram illustrating a result obtained by monitoring channel interleaving for a first address map of the plurality of address maps.

FIG. 3 illustrates an example in which channel interleaving has been monitored through two channels CH0 and CH1.

A first round Round1 indicates 0 to 1000 cycles, a second round Round2 indicates 1000 to 2000 cycles, and a third round Round3 indicates 2000 to 3000 cycles.

For example, with respect to the first address map, the external request is provided from the host 210 to the first channel CH0 10 times at the first round Round1, 18 times at the second round Round2, and 6 times at the third round Round3. The external request is provided from the host 210 to the second channel CH1 8 times at the first round Round1, 12 times at the second round Round2, and 4 times at the third round Round3.

A MPKC average value of the channels "Average MPKC" for each round may be calculated according to the equation below.

$$AverageMPCK = \frac{CH0 + CH1}{2}$$

Hence, the average value of the channels for each round may be 9 at the first round Round1, 15 at the second round Round2, and 5 at the third round Round3.

Then, a MPKC difference value "MPKC Difference" may be calculated according to the equation below.

$$MPKCDifference = \frac{|CH0 - CH1|}{NO. \text{ of Channels}}$$

Hence, since the number of channels is 2, the MPKC difference value "MPKC Difference" for the first round Round1, the second round Round2, and the third round Round3 may be 1, 3, and 1, respectively.

A MPKC difference average value between rounds "Avg.MPKC Difference" indicates an average value of MPKC difference values "MPKC Difference" between rounds. The MPKC difference average value between rounds "Avg.MPKC Difference" may be calculated according to the equation below.

$$Avg.MPKCDifference = \frac{A \times B + C}{Currentround}$$

$$A = Avg.MPKCDifference_{previous}$$

$$B = currentround - 1$$

$$C = MPKCDifference_{current}$$

According to the Equation above, the MPKC difference average value between rounds "Avg.MPKC Difference" of the first round Round1 is not calculated because there is no previous round to be compared. The MPKC difference average value between rounds "Avg.MPKC Difference" of the second round Round2 may be 2 since the MPKC difference average value between rounds "Avg.MPKC Difference" of the first round Round1 is regarded as the value "1" of the MPKC difference value "MPKC Difference" of the first round Round1. The MPKC difference average value between rounds "Avg.MPKC Difference" of the third round Round3 may be 1.6 because the MPKC difference average value between rounds "Avg.MPKC Difference" calculated for the second round Round2 is 2.

A MPKC average value between rounds "Avg.MPKC" indicates an average value of MPKC average values "Average MPKC" between rounds. The MPKC average value between rounds "Avg.MPKC" may be calculated according to the equation below.

$$Avg.MPKC = \frac{A + B + C}{Currentround}$$

$$A = Avg.MPKC_{previous}$$

$$B = currentround - 1$$

$$C = AverageMPKC_{current}$$

Hence the MPKC average value between rounds "Avg.MPKC" of the first round Round1 is not calculated because there is no previous round to be compared. The MPKC average value between rounds "Avg.MPKC" of the second round Round2 may be 12 since the MPKC average value between rounds "Avg.MPKC" of the first round Round1 is regarded as the value "9" of the MPKC average value "Average MPKC" of the first round Round1. The MPKC average value between rounds "Avg.MPKC" of the third round Round3 may be 9.6 because the MPKC average value between rounds "Avg.MPKC" calculated for the second round Round2 is 12.

The channel interleaving value for the first address map may be calculated by dividing the MPKC difference average value between rounds "Avg.MPKC Difference" at the last round, that is, the third round by the MPKC average value between rounds "Avg.MPKC". Accordingly, the channel interleaving value for the first address map may be finally derived as a value of 0.167 by dividing 1.6, which is the MPKC difference average value "Avg.MPKC Difference" at the third round Round3, by 9.6 which is the MPKC average value between rounds "Avg.MPKC" at the third round Round3.

FIG. 4 is a diagram illustrating a result obtained by monitoring channel interleaving for a second address map of the plurality of address maps.

FIG. 4 illustrates an example in which channel interleaving has been monitored through two channels CH0 and CH1.

In FIG. 4, similarly to FIG. 3 the MPKC average value "Average MPKC" for first and second channels CH0 and CH1, the MPKC difference value "MPKC Difference", the MPKC difference average value between rounds "Ave.MPKC difference", and the MPKC average value between rounds "Ave.MPKC" may be calculated, so that the channel interleaving value for the second address map may be derived according to the calculation result.

For example, with respect to the second address map, the external request is provided from the host 210 to the first channel CH0 twice at the first round Round1, 10 times at the second round Round2, and 7 times at the third round Round3. The external request is provided from the host 210 to the second channel CH1 16 times at the first round Round1, 20 times at the second round Round2, and 3 times at the third round Round3.

Since the MPKC average value "Average MPKC" for the first and second channels CH0 and CH1, the MPKC difference value "MPKC Difference", the MPKC difference average value between rounds "Ave.MPKC difference", and the MPKC average value between rounds "Ave.MPKC" are calculated through the same way as described above with reference to FIG. 3.

According to the equations as illustrated in FIG. 3, the channel interleaving value for the second address map may be calculated by dividing the MPKC difference average value between rounds "Avg.MPKC Difference" at the last round, that is, the third round Round3 by the MPKC average value between rounds "Avg.MPKC" Accordingly, the channel interleaving value for the second address map may be finally derived as a value of 0.534 by dividing 4.6, which is the MPKC difference average value "Avg.MPKC Difference" at the third round Round3, by 8.6 which is the MPKC average value between rounds "Avg.MPKC" at the third round Round3.

Referring to FIG. 3 and FIG. 4 it can be understood that the channel interleaving value for the first address map illustrated in FIG. 3 is 0.167 and the channel interleaving value for the second address map illustrated in FIG. 4 is 0.534. In other words, in the case of the first address map, a difference in the number of provided requests between channels is small, but in the case of the second address map, a difference in the number of provided requests between channels is larger than that in the first address map. As described above, as the difference in the number of the provided requests between channels is small, the channel interleaving value becomes small. This represents that channel interleaving performance is good.

In the embodiment of the present invention, the MPKC monitoring unit 223 obtains the channel interleaving value by using the result values up to the third round Round3; however, this can be changed and set by those skilled in the art.

Although various embodiments have been described for illustrative purposes, it will be apparent to those skilled in the art that various changes and modifications may be made without departing from the spirit and scope of the invention as defined in the following claims.

What is claimed is:

1. A semiconductor system comprising:
   a plurality of memory devices corresponding to a plurality of channels;
   an address mapping unit suitable for converting addresses corresponding to provided external requests according to a selected address map among a plurality of address maps;
   a monitoring unit suitable for monitoring a channel interleaving for a plurality of address maps by detecting the number of the external requests provided to each of the plurality of channels, and obtaining channel interleaving values; and
   a control unit suitable for providing a control signal for controlling the address mapping unit to select an address map from the plurality of address maps according to the channel interleaving values.

2. The semiconductor system of claim 1, further comprising a host suitable for providing the requests and receiving the control signal from the control unit.

3. The semiconductor system of claim 1, wherein the address mapping unit converts logical addresses provided along with the external requests to physical addresses for the plurality of memory devices according to the selected address map.

4. The semiconductor system of claim 3, wherein the monitoring unit is a Misses per kilo cycles (MPKC) monitor suitable for monitoring a number of the external requests inputted to each of the plurality of channels for 1000 cycles according to the selected address map.

5. The semiconductor system of claim 4, wherein the control unit controls the address mapping unit to select an address map having an optimal channel interleaving value according to the channel interleaving values.

6. The semiconductor system of claim 1, wherein the monitoring unit:
   detects a number of the external requests provided to each of the plurality of channels during each of a plurality of rounds each having predetermined cycles;
   detects a request average value between channels of each of the plurality of rounds;
   detects a request difference value between the channels of each of the plurality of rounds;
   detects a request difference average value between the plurality of rounds through the request difference value between the channels;
   detects a request average value between the plurality of rounds through the request average value between the channels; and
   obtains the channel interleaving values for the address maps through the request difference average value between the rounds and the request average value between the rounds.

7. A semiconductor system comprising:
   a host;
   a plurality of memory devices; and
   a memory controller that controls the plurality of memory devices,
   wherein the memory controller comprises:
      an address mapping unit suitable for converting addresses corresponding to provided external requests according to a selected address map among a plurality of address maps; and
      a monitoring unit suitable for monitoring a channel interleaving for a plurality of address maps by detecting the number of the external requests provided to each of the plurality of channels, and obtaining channel interleaving values,
      wherein the host controls the address mapping unit to select one among the plurality of address maps from the plurality of address maps according to the channel interleaving values.

8. The semiconductor system of claim 7, wherein the address mapping unit converts logical addresses provided along with the external requests to physical addresses for the plurality of memory devices according to the selected address map.

9. The semiconductor system of claim 8, wherein the monitoring unit is a Misses per kilo cycles (MPKC) monitor suitable for monitoring a number of the external requests inputted to each of the plurality of channels for 1000 cycles according to the selected address map.

10. The semiconductor system of claim 9, wherein the host comprises a control unit suitable for controlling the address mapping unit to select an address map having an optimal channel interleaving value according to the channel interleaving values.

11. The semiconductor system of claim 8, wherein the memory controller further comprises an input control unit suitable for controlling transfer of a request for a next address map from the host to the address mapping unit whenever the monitoring to each of the plurality of address maps is completed.

12. The semiconductor system of claim 7, wherein the memory controller further comprises:
   a mediation unit suitable for performing a scheduling operation to the provided external requests according to a high priority; and
   a command generation unit suitable for sequentially generating commands for controlling the plurality of memory devices in response to the external requests scheduled by the mediation unit.

13. The semiconductor system of claim 7, wherein the monitoring unit:
   detects a number of the external requests provided to each of the plurality of channels during each of a plurality of rounds each having predetermined cycles;
   detects a request average value between channels of each of the plurality of rounds;
   detects a request difference value between the channels of each of the plurality of rounds;
   detects a request difference average value between the plurality of rounds through the request difference value between the channels;
   detects a request average value between the plurality of rounds through the request average value between the channels; and
   obtains the channel interleaving values for the address maps through the request difference average value between the rounds and the request average value between the rounds.

14. An operating method of a semiconductor system, comprising:
   monitoring external requests provided to each of a plurality of channels according to a first address map;
   monitoring external requests provided to each of the plurality of channels according to a second address map; and
   comparing results of the monitoring of external requests according to the first and second address maps, and selecting one of the first and second address maps having an optimal channel interleaving value,
   wherein each of the monitoring of the external requests according to the first and second address maps comprises:
   detecting a number of the external requests provided to each of the plurality of channels during each of the plurality of rounds;
   detecting a request average value between channels of each of the plurality of rounds;
   detecting a request difference value between the channels of each of the plurality of rounds;
   detecting a request difference average value between the plurality of rounds through the request difference value between the channels;
   detecting a request average value between the plurality of rounds through the request average value between the channels; and
   obtaining a channel interleaving value for the corresponding address map through the request difference average value between the rounds and the request average value between the rounds.

15. The operating method of claim 14, wherein each of the monitoring of the external requests according to the first and second address maps is performed for a plurality of rounds each having 1000 cycles.

16. The operating method of claim 14, wherein the selecting of one of the first and second address maps is performed by selecting one of the first and second address maps having a minimum value between the channel interleaving values of the first and second address maps.

* * * * *